US007374084B2

(12) United States Patent
Mitchell

(10) Patent No.: US 7,374,084 B2
(45) Date of Patent: May 20, 2008

(54) ELECTRONIC LOCK WITH VISUAL INTERFACE

(75) Inventor: Ernst Kern Mitchell, Sterling Heights, MI (US)

(73) Assignee: Computerized Security Systems, Troy, MI (US)

( * ) Notice: Subject to any disclaimer, the term of this patent is extended or adjusted under 35 U.S.C. 154(b) by 333 days.

(21) Appl. No.: 10/872,078

(22) Filed: Jun. 18, 2004

(65) Prior Publication Data

US 2005/0279823 A1 Dec. 22, 2005

(51) Int. Cl.
*G06K 5/00* (2006.01)

(52) U.S. Cl. ....................................... 235/382; 235/380

(58) Field of Classification Search ................ 235/380, 235/382; 362/100

See application file for complete search history.

(56) References Cited

U.S. PATENT DOCUMENTS

| | | | | | |
|---|---|---|---|---|---|
| 3,787,714 | A | * | 1/1974 | Resnick et al. | 361/172 |
| 4,717,816 | A | * | 1/1988 | Raymond et al. | 235/382.5 |
| 5,057,975 | A | | 10/1991 | Evigan | |
| 5,111,007 | A | | 5/1992 | Miller et al. | |
| 5,179,325 | A | | 1/1993 | Aragon, Jr. | |
| 5,477,041 | A | * | 12/1995 | Miron et al. | 340/5.28 |
| 5,597,227 | A | | 1/1997 | Bergen et al. | |
| 5,933,085 | A | * | 8/1999 | Holcomb et al. | 340/5.66 |
| 6,351,977 | B1 | | 3/2002 | Pedroso et al. | |
| 6,461,013 | B1 | | 10/2002 | Simon | |
| 6,565,223 | B2 | | 5/2003 | Liao et al. | |
| 6,981,639 | B1 | * | 1/2006 | Pires | 235/382 |
| 2004/0263332 | A1 | * | 12/2004 | Maple et al. | 340/545.1 |

FOREIGN PATENT DOCUMENTS

| | | | |
|---|---|---|---|
| DE | 199 59 459 | A1 | 6/2001 |
| GB | 2 356 426 | A | 5/2001 |
| GB | 2 396 046 | A | 6/2004 |
| WO | WO 93/09319 | A | 5/1993 |

OTHER PUBLICATIONS

Search Report—mailing date Nov. 7, 2005.

* cited by examiner

*Primary Examiner*—Lisa M Caputo
(74) *Attorney, Agent, or Firm*—Carlson, Gaskey & Olds

(57) ABSTRACT

An electronic key card lock has a card reader having both card reading electronics and a visual interface integrated into a single unit. Portions of the card reader are made from a light transmitting material that act as both a physical guide for the card and a lens that can distribute light toward the outside of the lock. The light transmitting material houses the card reading electronics and also surrounds a slot that accommodates the key card. A slot in a trim panel of the lock exposes a slot and the front edge of the card reader. When a key card is inserted into the slot of the card reader, one or more light sources in the card reader illuminate to reflect whether the inserted card can open the lock. The light transmitting material distributes the light from the light source so that the front edge of the card reader around the card reader slot is evenly illuminated.

24 Claims, 5 Drawing Sheets

ELECTRONIC LOCK WITH VISUAL INTERFACE

TECHNICAL FIELD

The present invention relates to door locks, and more particularly to door locks having an electronic key card reader and a visual user interface.

BACKGROUND OF THE INVENTION

Door locks used in hotels often use electronic key cards rather than normal mechanical keys to control operation of a lock. Electronic key cards and electronic locks are easily programmable and therefore provide added security in a convenient manner. Unlike mechanical keys and locks, however, electronic key cards and electronic locks do not provide any physical feedback to the user to alert the user as to whether the card is inserted correctly into the lock or whether the key card is correctly programmed to open the lock.

To aid the user, electronic locks provide visual feedback in the form of indicator lights that illuminate in response to card insertion and/or removal. Depending on the desired visual effect, one or more lights can be programmed to, for example, illuminate a green light if the inserted card opens the lock and a red light if the card is inserted incorrectly or if the card is not programmed to open that particular lock.

The indicator lights in currently known electronic locks act as a visual interface that is separate from the card slot and its associated mechanisms. The card slot is visible through a slot cut in a trim panel of the electronic lock, and the indicator lights are visible and accessible via a separate plurality of holes cut in the trim panel. The indicator lights themselves are often LEDs that either extend through their corresponding holes or illuminate behind translucent or transparent lenses disposed in the holes.

Cutting the holes in addition to the card slot in the trim panel increase the overall cost of the manufacturing the lock. If lenses are used, they add yet another level of cost and complexity to the lock. Moreover, the additional holes needed to provide the visual interface create additional entry points that allow environmental contaminants (e.g., passing air, moisture, etc.) to reach the electronic components of the lock, potentially hastening degradation of the components. These holes may also act as an additional entry point that may be used in attempts to breach the electronic lock.

There is a desire to provide an illuminated visual interface for an electronic lock that accommodates key cards while reducing the number of openings in the lock trim panel that such an interface would normally require.

SUMMARY OF THE INVENTION

The present invention is directed to an electronic key card lock having a visual interface integrated with the card slot. More particularly, a card reader in the lock includes both card reading electronics and a visual interface integrated into a single unit. A housing of the card reader are made from a light transmitting material that act as both a physical guide for the card and as a lens that can distribute light toward the outside of the lock. Thus, the light transmitting material serves both a optical function and a mechanical function.

In one embodiment, the light transmitting material houses the card reading electronics and also surrounds a slot that accommodates the key card. A slot in a trim panel of the lock exposes a slot and the front edge of the card reader. When a key card is inserted into the slot of the card reader, one or more light sources in the card reader illuminate to reflect whether the inserted card can open the lock. The color and/or illumination pattern of the light sources can be controlled to provide different visual feedback messages based on whether the card is correctly inserted and encoded to open the lock. The light transmitting material distributes the light from the light source so that the front edge of the card reader around the card reader slot is evenly illuminated.

By integrating the card reading functions and visual feedback functions into a single light transmitting card reader, the trim panel of the lock does not need any additional openings to accommodate a visual interface because the card reader itself also acts as the visual interface. Thus, the trim panel only requires a single slot to provide both key card accommodation and visual feedback to the user, improving the lock's resistance to both tampering and environmental contamination.

DETAILED DESCRIPTION OF THE EMBODIMENTS

Figure 1:
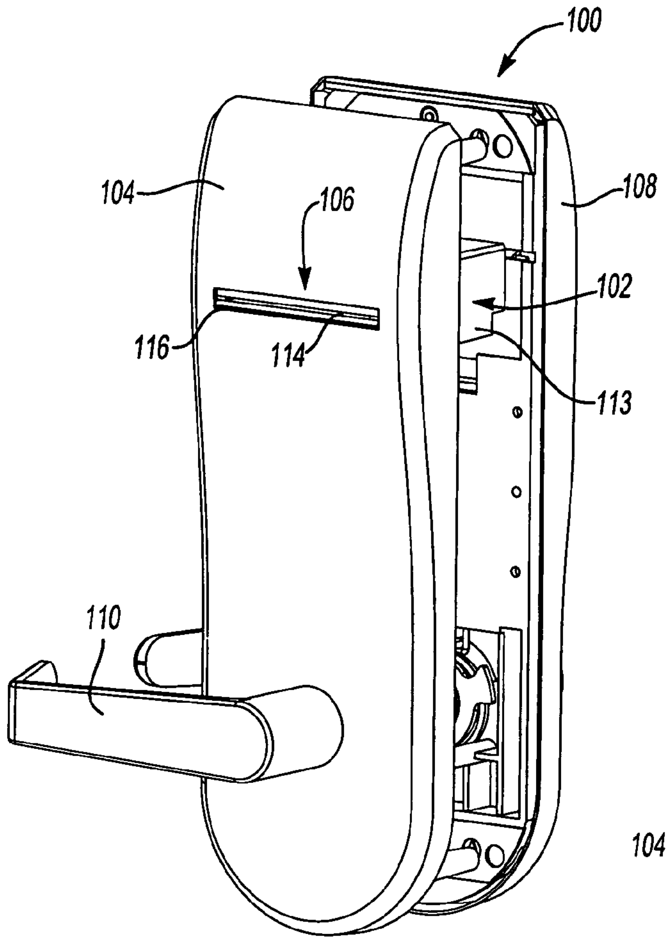
FIG. 1 is a perspective view of a lock according to one embodiment of the invention.
Figure 2:
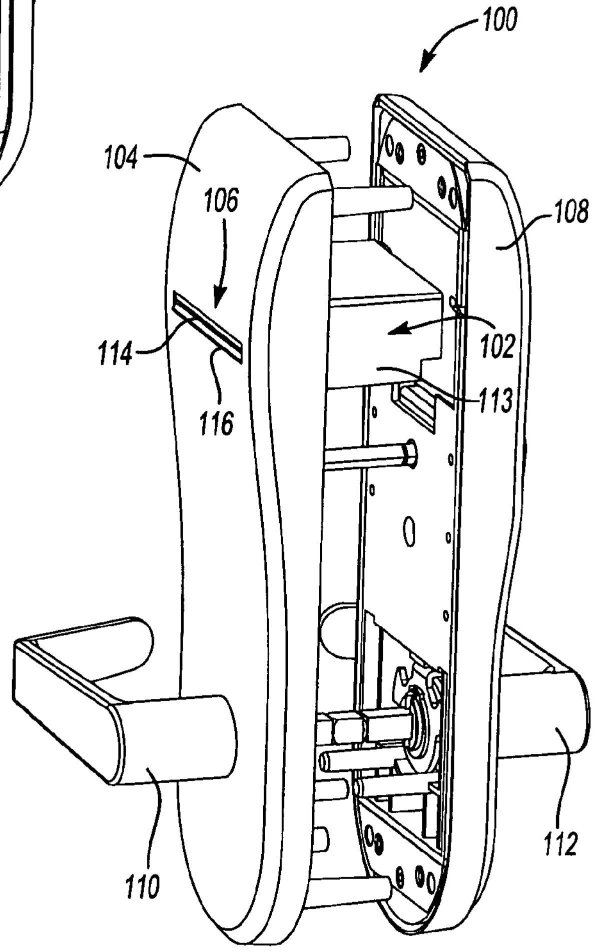
FIG. 2 is another perspective view of the lock shown in FIG. 1.
Figure 3:
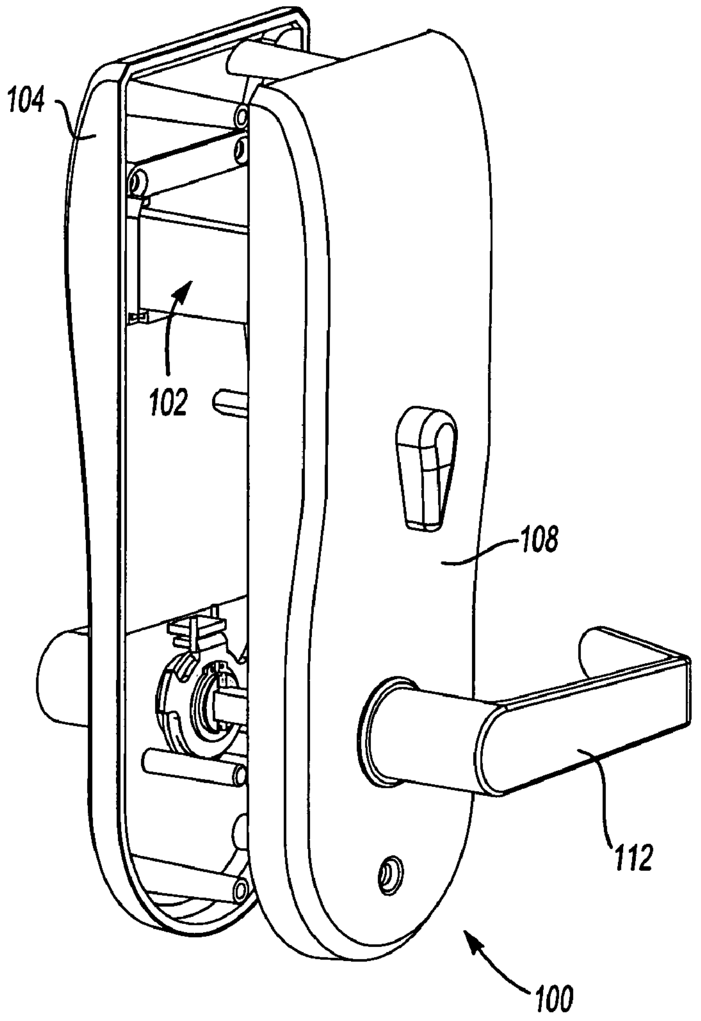
FIG. 3 is yet another perspective view of the lock shown in FIG. 1.
Figure 6:
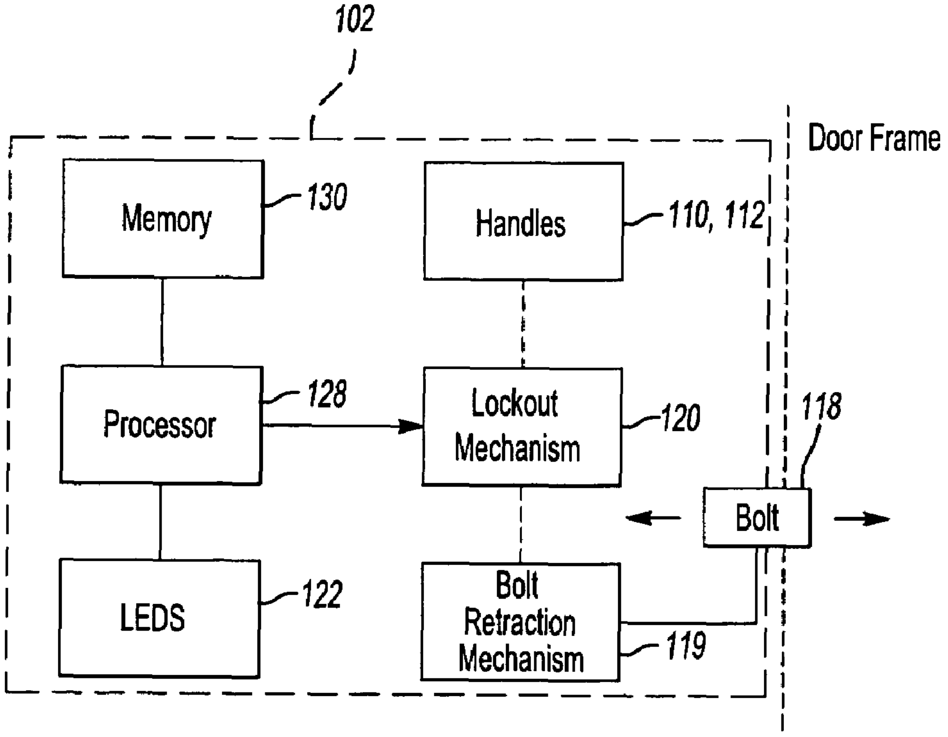
FIG. 6 is a representative block diagram of components of the lock.
Figure 7:
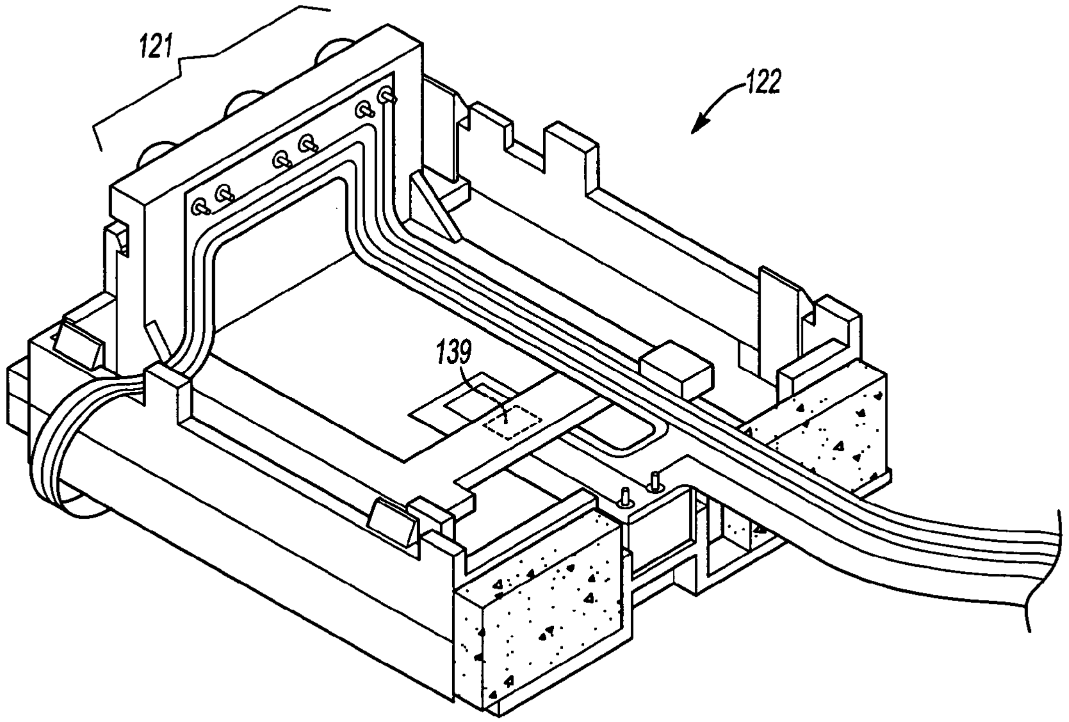
FIGS. 7, 8, and 9 illustrate one example of the card reader in more detail.
Figure 8:
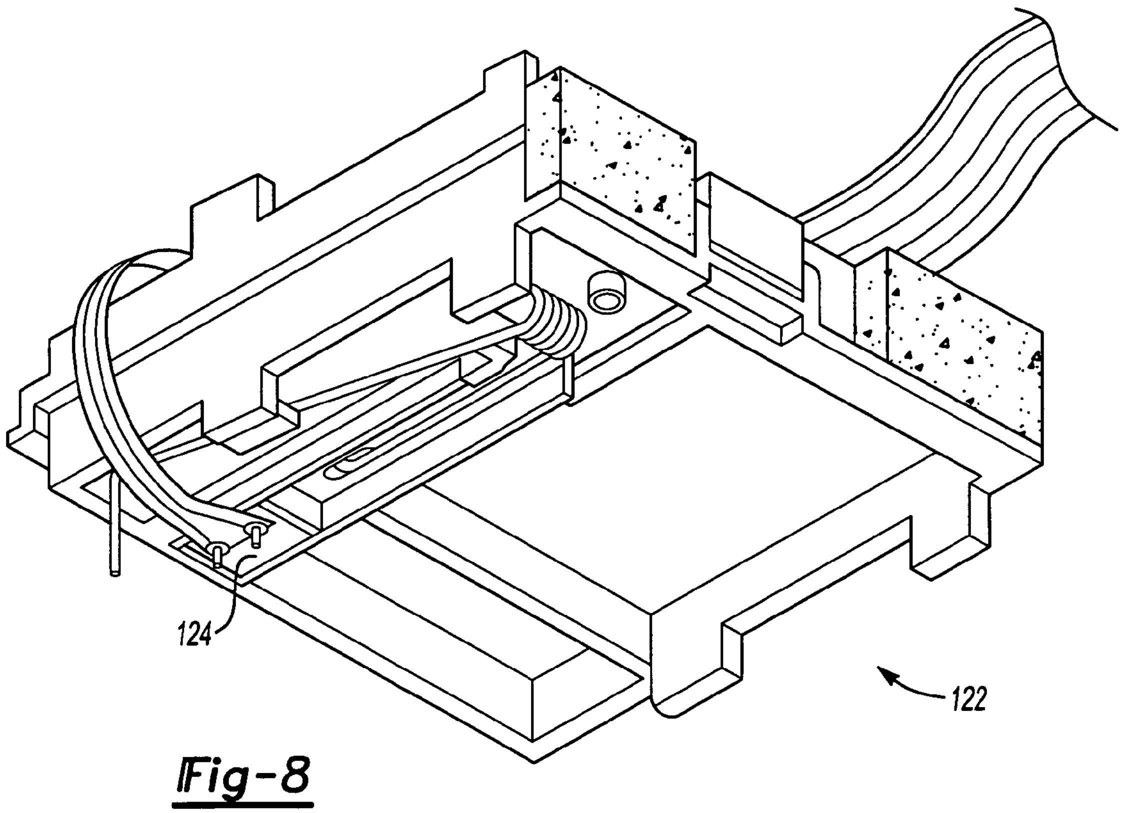
Figure 9:
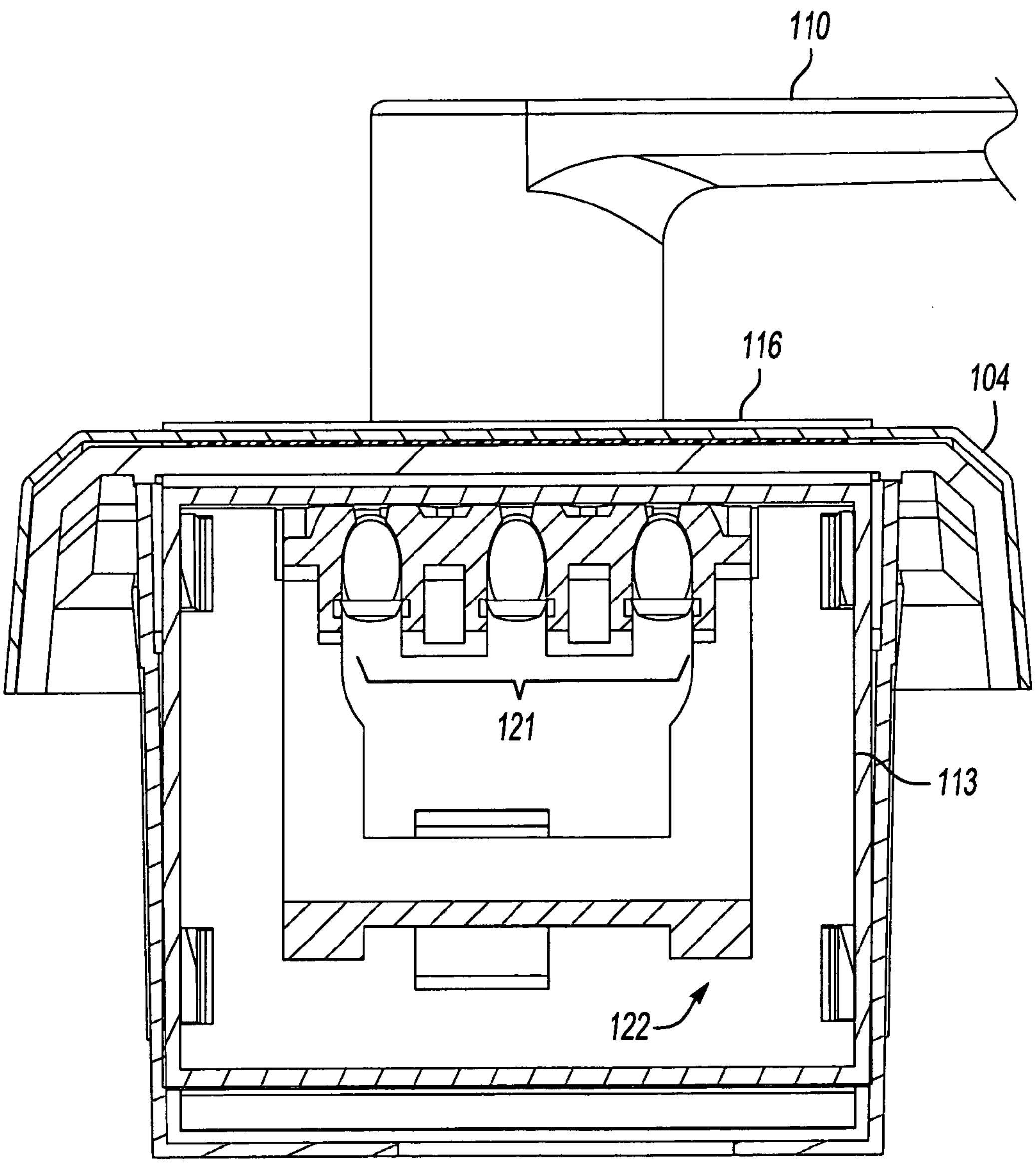

FIGS. 1 through 3 are perspective views of a lock 100 having a card reader 102 that integrates an electronic card reading mechanism and a visual interface according to one embodiment of the invention. FIG. 6 is a representative block diagram of basic components in the lock 100, and FIGS. 7 through 9 are more detailed diagrams of one example of the card reader. The card reading mechanism and visual interface can be incorporated into any lock structure without departing from the scope of the invention. One possible lock structure is described in commonly-assigned U.S. patent application Ser. No. 10/343,553, filed Oct. 23, 2003 (U.S. Published Patent Appln. No. 2004/0045330, published Mar. 11, 2004), the disclosure of which is incorporated herein by reference.

The lock 100 includes a front trim panel 104 having a trim slot 106 through which an electronic key card (not shown) can be inserted. A corresponding rear trim panel 108 is attachable to the front trim panel 104 with the card reader 102 sandwiched therebetween. The rear trim panel 108 will be oriented toward the inside of a room when the lock 100 is installed and therefore does not have a slot like the front trim panel 104. Manually operable door handles 110, 112 are attached to the lock 100 in any conventional manner.

The card reader 102 has a housing 113 with a card slot opening 114 and a front edge 116 that are exposed by the trim slot 106. The card slot 114 is sized to accommodate the electronic key card, and the front edge 116 surrounds at least the top and bottom longitudinal sides of the card slot 114. At least a front portion of the housing 113 is made of a light transmitting material, such as translucent or transparent plastic. Note that other components in the card reader 102 may also be formed out of light transmitting material as well, if desired, to obtain a desired appearance and light distribution.

As represented in FIG. 6, the card reader 102 is operably coupled to a retractable latch bolt 118 via any desired bolt retraction mechanism 119. The latch bolt 118 is operably connected to the handles 110, 112 so that the latch bolt 118 can be moved from an extended position to a retracted position by turning one of the handles 110, 112. As is known in the art, the latch bolt 118 is movable between an extended position, where the latch bolt 118 engages with a corresponding recess in a door frame, and a retracted position, where the latch bolt 118 is withdrawn from the door frame so that the door can be opened. The handles 110, 112 may be operably engaged with the latch bolt 118 via any known structure, such as a spindle that translates the rotational movement of the handles 110, 112 into linear movement of the latch bolt 118.

The card reader 102 communicates with the latch bolt 118 so that insertion of a correctly encoded key card into the card reader 102 allows the latch bolt 118 to be retracted. The specific way in which the card reader 102 and the latch bolt 118 interact to move the latch bolt 118 between the locked and unlocked positions can be via any known actuator mechanism without departing from the scope of the invention. If the correctly encoded key card is not inserted into the card reader 102, a motor-driven electronic lockout mechanism 120 mechanically blocks the handle 110 from operating the latch bolt 118. In one example, the lockout mechanism 120 engages a portion of handle 110 to prevent the handle 110 from turning to retract the latch bolt 118. The lockout mechanism 120 may also operably disconnect the bolt retraction mechanism 119 from the handle 110 or otherwise block the bolt retraction mechanism 119 so that the latch bolt 118 will not retract even if the handle 110 is turned. In other words, the lockout mechanism 120 controls whether the latch bolt 118 is an operable state or an inoperable state.

Figure 4:
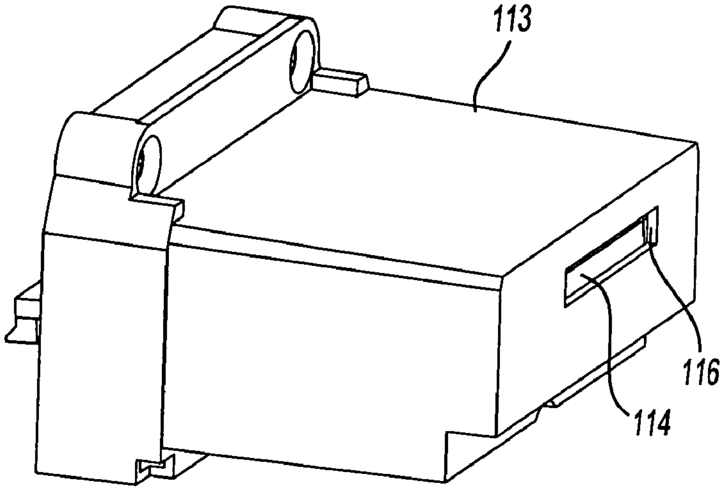
FIGS. 4 and 5 are representative diagrams of a card reader used in the lock shown in FIG. 1 according to one embodiment of the invention.
Figure 5:
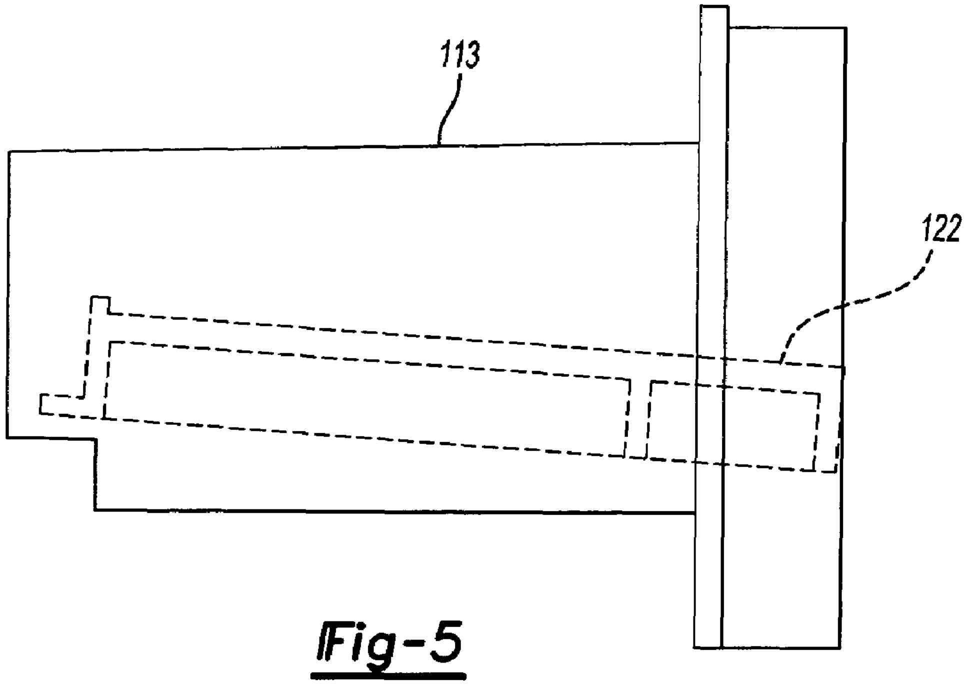

FIGS. 4 and 5 are representative diagrams of an example of the card reader 102, and FIGS. 7 through 9 show one example of the card reader 102 in more detail. As noted above, the housing 113 of the card reader 102 in this example has a generally rectangular shape and is formed of a light transmitting material, such as molded plastic.

The housing 113 of the card reader 102 encloses at least one light source 121 and card reading electronics, such as a magnetic read head 124 and/or a smart card read head 139. The card reader 102 may also have a keycard sensing switch (not shown) to detect when a card is properly inserted into the card slot 114. Other components, such as a memory for storing access tracking information, a clock, and/or a write head to write access data to an inserted key card, may also be included in the card reader 102 if desired. The various components of the card reader 102 can be powered by any desired method, such as a battery or direct wiring to an external power source (not shown).

The light sources 121 can include any type of illumination device, such as LEDs. The read heads 124, 139 and the light sources 121 communicate with a processor 128 that determines whether the code on the key card matches a key code in the lock 100 (e.g., a code stored in a memory 130). The processor 128 itself may be in, for example, a programmable integrated circuit chip. If the codes match, the processor 128 sends an unlocking signal to the lockout mechanism 120 to allow the latch bolt 118 to be moved into a retracted position (i.e., to allow the handles 110 to actuate the latch bolt 118) when the handle 110 is turned.

The light sources 121 themselves may be retained in the card reader module 122 by any method, such as by integrating the light sources 121 and the card reading electronics into a single module or by placing the light sources 121 on a separate module that is later attached to the card reader 102 via a snap fit, a clamp, or any other appropriate attachment structure. As shown in FIGS. 4 and 5, the light sources 121 are disposed in the card reader housing 113 so that the light transmitting material of the housing 113 distributes the light substantially evenly around the front edge 116 of the card reader 102. Thus, the card reader 102 itself also acts as the visual interface for the lock 100 by illuminating the front edge 116 so that it is easily visible to the user.

Note that because the front edge 116 has a larger area than conventional indicator lights and also surrounds the card slot 114, the inventive structure provides a more easily visible visual interface to the user and can even guide the user to the location of the card slot 114 if at least one of the light sources 121 is allowed to stay constantly illuminated. The light transmitting material in the housing 113 may include indentations or other shaping near the light sources 121 so that the housing 113 acts as lenses for the light sources 121. Shaping the housing 113 in this manner provides even greater control over the light distribution to improve the visual interface to the user.

The processor 128 controls the light sources 121 so that they visually indicate whether the latch bolt 118 is movable to the retracted position. For example, if the light sources 121 include green LEDs to indicate a code matching condition and red LEDs to indicate a code mismatch and/or improper card insertion, the processor 128 may instruct only the green LEDs to illuminate when the latch bolt 118 is retractable and instruct only the red LEDs to illuminate when the latch bolt 118 remains locked in an extended position after the card is inserted and removed. Other illumination schemes, as well as intermittent flashing of the light sources 121 in a desired illumination pattern, may also be controlled by the processor 128 if desired without departing from the scope of the invention. For example, the processor 128 may instruct the red LEDs to flash if the card is inserted improperly or if there is a fault in the card reader 102. Those of ordinary skill in the art will understand that the processor 128 can be programmed to illuminate the light sources 121 in any desired manner.

By integrating the light sources 121 and the card reading electronics (e.g., the magnetic read head 124 and/or the smart card read head 126) into a single card reader 102 and by using a light transmitting material in at least the card reader housing 113, the inventive card reader 102 serves as both a key card reader and a visual interface, eliminating the need for a separate visual interface. The front trim panel 104 therefore only requires a single opening in the form of the trim slot 106 to provide both access to the card reader 102 and visual feedback, without any separate openings or lenses to form a visual interface. By eliminating the extra openings in the front trim panel 104 and the separate lenses, inventive lock 100 is simpler and less costly to manufacture and also reduces the number of entry points for environmental contaminants and lock breaching attempts.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. An electronic key card reader, comprising:

a housing having at least a portion made of a light transmitting material, the housing having a front edge and a card slot;

card reading electronics disposed within the housing;

a processor that communicates with the card reading electronics; and at least one light source disposed in the housing and in communication with the processor, wherein the processor controls said at least one light source based on operation of the card reading electronics to illuminate the front edge.

2. The key card reader of claim 1, wherein the housing has at least one indentation that distributes light from said at least one light source to illuminate the front edge substantially evenly.

3. The key card reader of claim 1, wherein the card reading electronics comprises at least one of a magnetic read head and a smart card read head.

4. The key card reader of claim 3, further comprising a keycard sensing switch that detects when a key card is correctly inserted into the card reader.

5. The key card reader of claim 1, wherein said at least one light source comprises a plurality of light sources.

6. The key card reader of claim 5, wherein the plurality of light sources are LEDs.

7. The key card reader of claim 5, wherein the plurality of light sources comprises at least one light source of a first color and at least one light source of a second color.

8. The key card reader of claim 5, wherein the processor controls the light sources so that the first color reflects an unlocked condition and the second color reflects a locked condition.

9. The key card reader of claim 1, wherein the processor controls said at least one light source to illuminate intermittently in at least one illumination pattern.

10. The lock of claim 1, wherein said at least one light source is illuminated after said card reading electronics have received and analyzed a key card.

11. An electronic lock, comprising:

a trim panel having a trim slot;

a card reader having a housing having at least a portion made of a light transmitting material, the housing having a front edge and a card slot that are exposed by the trim slot, card reading electronics disposed within the housing comprising at least one of a magnetic read head and a smart card read head, a keycard sensing switch that detects when a key card is correctly inserted into the card reader, a processor that communicates with the card reading electronics, and at least one light source disposed in the housing and in communication with the processor, wherein the processor controls said at least one light source based on operation of the card reading electronics to illuminate the front edge;

a latch bolt; and a latch bolt actuator controllable by the processor to change the latch bolt between an operable state and an inoperable state, wherein said at least one light source is illuminated to reflect the state of the latch bolt.

12. The lock of claim 11, further comprising a manually-operable lever coupled to the latch bolt to allow manual movement of the latch bolt between the operable state and the inoperable state.

13. The lock of claim 11, further comprising a rear trim panel, wherein the card reader is disposed between the trim panel and the rear trim panel.

14. The lock of claim 11, wherein said at least one light source comprises a plurality of light sources.

15. The lock of claim 14, wherein the plurality of light sources are LEDs.

16. The lock of claim 14, wherein the plurality of light sources comprises at least one light source of a first color and at least one light source of a second color, wherein the processor controls the light sources so that the first color is illuminated when the bolt is in the operable state and the second color is illuminated when the bolt is in the inoperable state.

17. The lock of claim 11, wherein said at least one light source is illuminated after said card reading electronics have received and analyzed a key card.

18. An electronic lock comprising:

a trim panel having a trim slot;

a card reader positioned on a first side of said trim panel to be an interior side of said trim panel facing a door when mounted to a door, said card reader having card reading electronics, and a light source in communication with said card reading electronics, said light source being operable to selectively transmit light from said first side of said trim panel through said trim slot, and outwardly of a second face of said trim panel with said light being controlled dependent on whether said card reading electronics determines a proper key card is received in said trim slot.

19. The electronic lock as set forth in claim 18, wherein said light is distributed evenly around said trim slot.

20. The electronic lock as set forth in claim 18, wherein said at least one light source includes a plurality of light sources of different colors, and a different color of said light source is illuminated based upon whether said card reading electronics determines that the key card inserted into said key slot is a proper key or is an improper key.

21. The electronic lock of claim 18, wherein said at least one light source transmits light through a light transmitting material which provides at least a portion of a housing.

22. The electronic lock as set forth in claim 21, wherein an entirety of said housing is formed of said light transmitting material.

23. A method of operating an electronic lock comprising the steps of:

(1) providing a trim panel having a trim slot to receive a key card, and a card reader positioned inwardly of said trim slot;

(2) inserting a key card into said card reader through said trim slot, and providing a light at said trim slot controlled by said card reader in response to said card reader having analyzed the key card.

24. The method as set forth in claim 23, wherein a distinct color light is actuated at said key slot dependent upon whether said card reader analyzes the key card to be a proper key or an improper key.

* * * * *